United States Patent [19]

Sutcliffe et al.

[11] Patent Number: 4,615,547

[45] Date of Patent: Oct. 7, 1986

[54] MULTI-PLANE SWIVEL CONNECTOR

[75] Inventors: Grenville G. Sutcliffe, Villa Ridge; Arthur C. Fink, Jr., Lonedell, both of Mo.

[73] Assignee: Husky Corporation, Pacific, Mo.

[21] Appl. No.: 444,500

[22] Filed: Nov. 24, 1982

[51] Int. Cl.[4] ............................................. F16L 39/00
[52] U.S. Cl. .................................... 285/136; 285/168; 285/276; 285/281; 285/422; 285/351; 285/918
[58] Field of Search ............... 285/134, 136, 276, 281, 285/DIG. 19, 60, 422, 222, 168, 273, 351; 148/441, 125, 11.5 A, 2, 3; 141/389, 290, 39 L

[56] References Cited

U.S. PATENT DOCUMENTS

| | | | |
|---|---|---|---|
| 2,745,682 | 5/1956 | Chevallier | 285/276 X |
| 3,011,803 | 12/1961 | Buckner et al. | 285/DIG. 19 |
| 3,558,163 | 1/1971 | Moore et al. | 285/276 X |
| 3,986,732 | 10/1976 | Stanley | 285/281 |
| 4,239,262 | 12/1980 | Krupp et al. | 285/134 X |
| 4,260,183 | 4/1981 | Krupp | 285/276 X |

FOREIGN PATENT DOCUMENTS 2706323  8/1977  Fed. Rep. of Germany ...... 285/351

Primary Examiner—Dave W. Arola
Attorney, Agent, or Firm—Paul M. Denk

[57] ABSTRACT

A multi-plane swivel connector for use in attaching a pair of fluid conveying members together, the connector including a pair of swivel portions, that connect together at proximate ends, one end being insertable within the other, a double sealed connection provided at the junction of the connection of the swivel ends together, there being a swivel nut securing externally to the outer end of one of the pair of swivel portions, there being a double sealed connection provided between the said swivel nut and the said contiguous swivel portion, there being a pair of O-rings provided at each of the double sealed connections between the swivel portions, and the connection of the swivel nut to one of these swivel portions, said pair of O-rings at each double sealed connection being of step relationship with one O-ring being of greater diameter than the other O-ring, one of the O-rings being formed of fluoro carbon, while the other O-ring of each double sealed connection being formed of fluoro silicone; and during the formation of the swivel portions, as through their formation as cast metal parts during an injection molding process, the pressures applied during the injection molding process being increased from the moment of injection until rapid cooling of the cast parts occurs, with the increased pressures being applied to prevent dendritic growth of the cast parts.

14 Claims, 9 Drawing Figures

/ 1

MULTI-PLANE SWIVEL CONNECTOR

CROSS REFERENCE TO RELATED APPLICATION

The subject matter of this application is related to and comprises a continuation-in-part patent application of the earlier application of GRENVILLE G. SUTCLIFFE, Ser. No. 160,088, filed in the United States Patent and Trademark Office on June 16, 1980.

BACKGROUND OF THE INVENTION

This invention relates generally to a swivel connection, and more specifically pertains to an improved fuel line swivel connection that provides for multi-plane swiveling of the fuel pump nozzle through the agency of this connector.

A variety of various types of swivel connectors for use in conjunction even particularly with gasoline dispensing, have been available in the prior art. A number of problems, or at least adverse conditions, that have occurred more recently make the contemporaneous swivel connections rather obsolete, or at least difficult of usage. This is due to the fact that vapor recovery has now become of vogue, for the purpose of preventing admission of fumes into the atmosphere, and, as a result, the rather cumbersome type of swivel connectors available in the art, and in use, have generally been manufactured for singular usage, and not for use in combination, as through the application of a pair these swivel connectors, particularly where a second hose line is required for vapor recovery purposes. In addition, self-service in the dispensing of gasoline has also become standard practice. And, the existing type of swivel connectors that are of a rather heavyweight construction do add a fair amount of weight to the usage of the fuel dispensing nozzle, making it rather cumbersome of usage by the customer, who is ndw rather bent upon filling his or her own gas tank at the service station. Thus, change is required particularly in the improvement of the type of swivel connector utilized in the fuel dispensing line, and the current invention attempts to remedy these prevailing problems in this particular art.

Examples of the type of prior art swivel connectors readily available are shown in the prior U.S. Pat. No. Des. 33,258, to Kelly. In addition, the prior patent to Tullach, U.S. Pat. No. Des. 59,942, shows another embodiment. The U.S. Pat. No. Des. 137,231, to Phillips, shows another form of swivel joint, as does the U.S. Pat. No. 140,716, also upon a design for a swivel joint, also patented by Mr. Phillips. The prior United States patent upon an adjustable coupling discloses a swivel type of connection, for swiveling in one plane, as patented in the U.S. Pat. No. Des. 179,768 by Giles. An earlier patent to Chevallier, U.S. Pat. No. 2,745,682, discloses a swivel coupling for gasoline dispensers. Likewise, a swivel fitting is shown in the earlier U.S. Pat. No. 3,367,681, to Braukman. Finally, the prior patent to Moore, et al., U.S. Pat. No. 3,558,163, shows a swivel connecter for tubing.

It is the principal object of the current invention to provide a multi-plane swivel connector useful for adding dexterity to the application of the fuel dispenser and its nozzle, particularly during self-service applications, and to further furnish such a connector of more lighter weight materials so as to more readily accommodate its usage by the said self-service customer.

A further object of this invention is the provision of the formation of effective fluid tight seals made within a swivel connector even though the connector is capable of swiveling along a variety of discrete planes during application of the fuel dispenser and nozzel as during delivery of gasoline.

A further object of this invention is to provide a multi-plane and very light weight swivel connector for use in fuel lines, particularly at fuel dispensers, while facilitating and accommodating especially self-service dispensing of gasoline, related fuels, or the like.

Another object of this invention is to provide a specially designed swivel connector that may also be used upon gasohol pumps, and without encountering any unusual seal deterioration as normally occurs within current connectors now in usage.

Still another object of this invention is to provide a swivel connector that may be used in pairs, for providing multiple swiveling of the two connectors as when coupled within a dispenser nozzle that further affords varpor recovery during the delivery of gasoline or other fuels.

Yet another object of this invention, in view of the just previously defined advantage, is to provide a swivel connector that may be used in pairs, and without encountering any binding during their multiple swivel functioning as a result of the unique design for limiting the degree of swivel through their fabricated connectors.

Still another object of this invention to provide a very lightweight swivel connector for use in dispensing.

Another object of this invention is to provide a swivel connector wherein each plane of swiveling incorporates at least a pair of seals, arranged in stepped relationship, so as to further assure fluid tight seals against any leakage of fuel at the location of the bearing plane of swivel.

Yet another object of this invention is to provide bearing seals that facilitate connector swiveling and prevent and retard leakage due to the fabrication of the seals from a lubricant type of composition as combined with polymers used in their formation.

These and other objects will be more apparent to those skilled in the art upon reviewing the summary of this invention, and upon undertaking a study of the description of its preferred embodiment in view of the drawings.

SUMMARY OF THE INVENTION

This invention contemplates the formation of a particularly designed multi-plane swivel connector, which as previously identified, has enhanced results when used in conjunction with fuel dispensing, and particularly at the location where it interconnects between the fuel dispensing nozzle and the fuel line at the gasoline dispenser. The principle or purpose of the multi-plane swivel arrangement being incorporated between the fuel dispensing nozzle, and the dispenser hose, is to make it much easier to manipulate the nozzle, without bending of the accompanying hose, and therein increasing the latters useful life.

With the increasing number of conversions to self-service service station outlets, more women and younger persons are and will be using these fuel dispensing facilities for filling of their vehicles, and this is so because not only is it lesser expensive to fill up the fuel tank at the self-service pump, but in addition, and in many instances, it can be done much quicker than the delays normally encountered while awaiting for an attendant to take care of the same. As previously explained, the presently available and commercially used multi-plane swivels have a tendency to defeat their own purpose, at least when used in this more contemporary self-service setting, in that while they do provide some flexibility in the connection between the fuel dispensing nozzle and the hoze, they do increase the weight of the nozzle by at least thirty percent, and as much as forty-five percent, they are made of heavier materials and additionally are quite bulky, and therefore, do not lend themselves to ease of usage by the amateur when availing himself to the self-service feature.

As previously stated, in the case of a dispensing nozzle incorporating vapor recovery, such as may even be required in particular jurisdictions, two hoses are employed, one for delivering the fuel supply, and the other for the taking away of fuel vapors, and consequently, under current conditions, two of the heavy and bulky multi-plane swivels current available must be used. Hence, as explained, one of the purposes of this invention is to provide a multi-plane swivel which is much lighter, perhaps as much as forty-six percent to one hundred fifty percent lighter in weight, in addition to being smaller, perhaps only two thirds of the current connectors length, and due to its integral construction affords a lower resistance to fuel flow than any multi-plane swivel presently available upon the market. And, such is achieved without sacrificing flexibility, high strength, or longer duration of usage as can be attained from this current invention. The reason for this is that this multi-plane swivel connector of this invention utilizes zinc-aluminum alloys that are cast with metal dies to provide a rapid solidification of the alloys and in a manner that retards dendritic growth, and which rapid metal hardening during casting achieves a fine grain structure that produces the optimum mechanical properties both needed and desired for a connector of this type of application. That is, the achievement of both high strength and excellent bearing characteristics for a connector during use. The application of the zinc-aluminum alloys, in replacing the much heavier brass or steel that is commonly used in connectors currently, provides both the necessary high strength required, and the lightweight desired, for the connector of this invention. The fine bearing qualities of this connector eliminates the need for any separate insert of material having bearing characteristics at the location where the swivel connection is made, as in current connectors, which have a tendency to both increase the size and weight of the formed swivel.

During formation of these casting, the zinc aluminum alloys are die cast in an injection molding process, and after casting, the moldings are rapidly chilled during application of increasing pressure, to provide very dense swivel components, and ones that do retard that dendritic growth. During injecting of the metal, approximately 1800 psi of pressure is applied, but during rapid cooling, the pressure is increased to approximately 30000 psi. This prevents component shrinkage, retards the development of porosity, and maintains metal density.

Prior to the advent of unleaded gasoline and gasohol, a synthetic rubber compound was used to form the seals at the swivel joints for connectors of this application. That rubber compound was required because it was more compatible with the fuel being dispensed, remained flexible at low temperatures, was wear resistant. But, unfortunately, this type of material is just not compatible with the new style of fuels that are currently available, and becoming in vogue, which have a tendency to cause the seals to rapidly wear, and to leak prematurely. None of the seals available at this time had all three of the characteristics needed for providing and attaining a quality functioning swivel connector, those characteristics being the possession of compatibility with unleaded gasoline and gasohol, exhibiting high resistance to abrasive wear, and yet attaining and maintaining sufficient flexibility at lower temperatures.

Two synthetic rubber seals have been found that are compatible with such fuels, one having a low temperature flexibility, while the other exhibits high resistance to abrasive wear. The advantage in the application of this material has been incorporated into the multi-plane swivel connector of this invention, and further fortifies the connector, after prolonged usage, against leakage by incorporating two seals at each bearing joint. The inner seal is formed having compatibility with the current fuels being dispensed, and at the same time, exhibits the desired flexibility at low temperatures. It functions to prevent leaks even down to as low as forty degrees below zero Farhenheit. The outer seal of this swivel connector is also compatible with the fuels currently being dispensed, but it further exhibits high resistance to abrasive wear and protects the inner seal from being contaminated from sand, dirt, and other type of deleterious particles commonly found at the situs of usage.

A further innovation is that the multiple seals incorporated at each joint for this connector are of a significantly lesser diameter than that normally found in connectors of this type, wherein such seals are formed as O-rings having only a 1/16 inch more or less diameter at nominal cross section, and therefore, having lesser surface area for contact, thereby substantially reducing any generated friction. The use the pair of seals, at each bearing joint, in a stepped fashion, has been found to reduce both the size and weight necessary in the formation of the manufactured connector.

With regard to the type of seals used in the swivel connector, the most effective material found for this application is a fluoro composition, for use in fabrication of the O-rings for use in the sealed connection, and a composition of fluorocarbon or fluorosilicone has been found very effective for this purpose. Fluorocarbon composition may generally be obtained from a company such as DuPont, located at Wilmington, Del., which markets the composition under the trademark Viton.

The fluorocarbon formed seals are used as the outer seals for each swivel connection, and are useful for resisting abrasion, functions as a dust cover or seal, and are resistant to deterioration upon exposure to fuel. The fluorosilicone formed seals are preferrably used as the inner seals and are more useful for their sealing properties, and proferrably exhibit good low temperature sealing properties.

Structural wise, the swivel connector of this invention includes two main parts, two swivel portions, that are interconnected together, at proximate ends, with one end being insertable within the other to form a bearinged seal, yet pivotal with respect to each other, at this location. Thus, the one bearing portion end forms the male portion for accepting the proximate female end of the other swivel portion. At the location of this formed swivel connection, grooves are formed within the female end for accommodating the fluoro formed O-rings therein, and which provide for both a sealed connection at this location, to prevent the leakage of fuel there passed, but at the same time, being constructed of the fluoro composition they are highly wear resistant, and yet of lower frictional coefficient so as to facilitate the ease of swiveling of the connector at this location, and the pivoting of the nozzle during its application in fuel dispensing, as previously explained. One of the O-rings fits within a groove and seals against the surface of the insertable end of the one swivel portion, while both portions have mated stepped parts forming shoulders between which another of the said O-rings insert, and being biased against each of the shoulders through the application of a retainer means, such as a snap ring, that is accommodated on the innermost inserted end of the one swivel portion that swivel mounts within the other, as previously described. Thus, a double sealed bearing is provided at the juncture of this main swivel connection formed between the two portions of this constructed connector.

At each of the other or outer ends of the swivel portions are formed connecting means for accommodating other junctions for use for securing the connector with both the fuel nozzle and the fuel line. At one end there is formed threadlike means for accommodating a pipe like junction therein, and which is useful for forming a sealed connection with the fuel hose. At the outer end of the other swivel portion is provided a swivel nut, which likewise has a double O-ring formed bearing that accommodates another plane of swiveling thereat, while at the same time, forming a sealed bearing against leakage of any fluid or fuel therefrom. Another snap ring is formed onto that end of the swivel portion, and biases against the end of the inserted swivel nut so as to snuggly press one of the O-rings of this sealed bearing into place, and to thereat prevent fuel leakage, but at the same time readily accommodate low friction swiveling of both the swivel nut upon this portion of the formed connector.

Another feature of this invention that enhances its usage during application, particularly when a pair of the swivel connectors are used laterally of each other, within the fuel line, and for facilitating vapor recovery, is that the most contiguous portions of the laterally disposed swivel connectors are formed having flared surfaces, of rather boss like configuration, so that these surfaces encounter each other to prevent further swiveling of each of the connectors and its attached fuel nozzle beyond that degree of pivot necessary to allow for the convenient usage and application of the nozzle. Such also prevents the extent of pivot that would cause the two connectors to bind upon each other and to prevent proper minipulation during and after fuel dispensing.

BRIEF DESCRIPTION OF THE DRAWINGS

In the drawings, FIG. 1 provides a side view of the swivel connector of this invention.

DESCRIPTION OF THE PREFERRED EMBODIMENT

Figure 1:
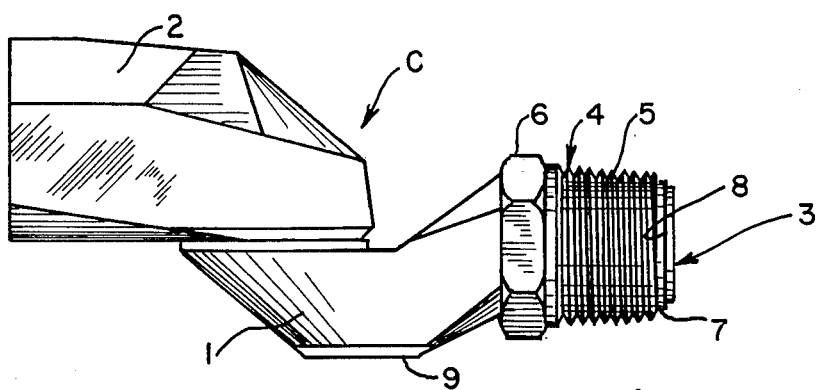
Figure 2:
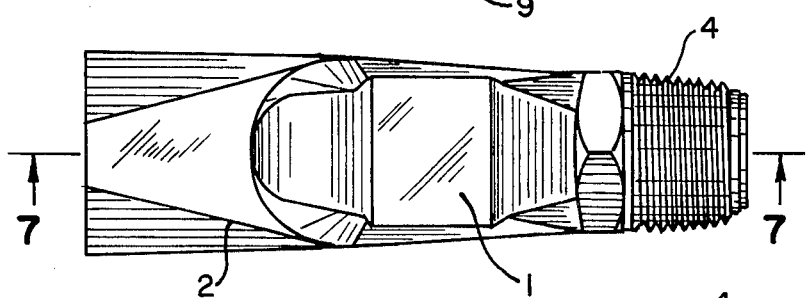
FIG. 2 provides a top plan view thereof.
Figure 3:
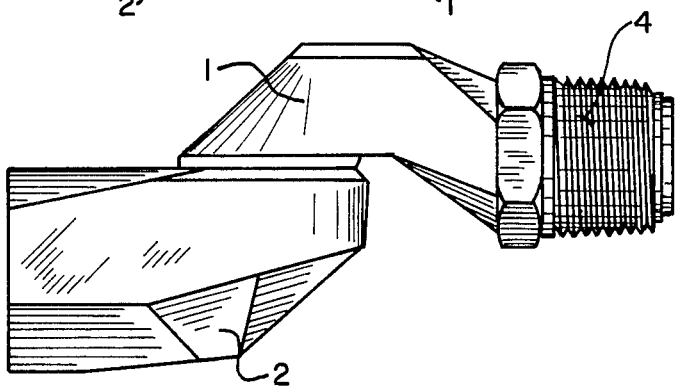
FIG. 3 provides an opposite side view of the swivel connector.
Figure 4:
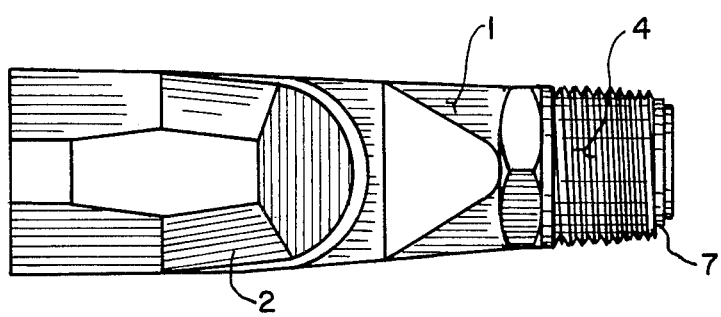
FIG. 4 provides a bottom plan view thereof.
Figure 5:
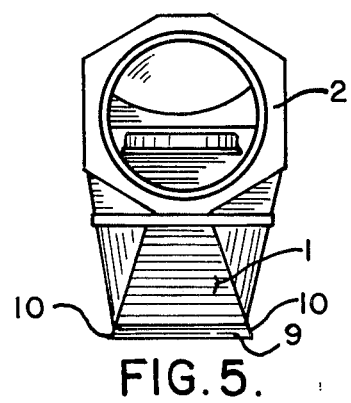
FIG. 5 provides a front view of the swivel connector.
Figure 6:
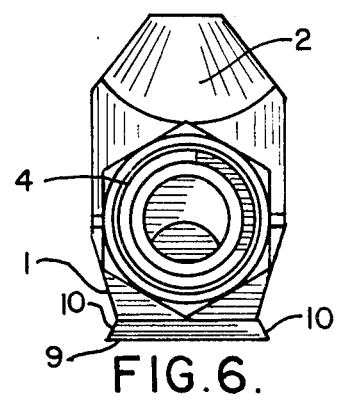
FIG. 6 provides a back view of the swivel connector.

In referring to the drawings, and in particular FIGS. 1 through 6, there is disclosed the multi-plane swivel connector C of this invention. It various components include a pair of swivel portions, one being generally identified as a male formed swivel portion 1, and a female formed swivel portion 2. These swivel portions, as will be subsequently defined, interconnect through an inserting connection of one within the other, and form both a swivel connection and a sealed bearing at this juncture. The male formed swivel portion includes at its other end, as at 3, means for attaching the connector with the fuel dispensing nozzle, and this means provides the swivel nut 4, as shown. This nut is formed having a threaded portion 5, that conveniently threads tightly within the standard end of the dispenser nozzle, while its opposite end is formed multi shaped, as at 6, to facilitate the application of wrench thereto to provide for its firm tightening within the said nozzle. A snap ring 7 inserts within a formed groove, as at 8, provided upon the exposed end 3 of the swivel portion 1.

Also provided integrally constructed upon this swivel connector is a boss like member 9, which is flared along lines of bevel, as at 10, and for purposes which will be subsequently described, although as briefly previously analyzed, this member is useful for preventing any binding of the swivel connector with another when a pair of the same are laterally disposed when applied for vapor recovery purposes in an installation.

Figure 8:
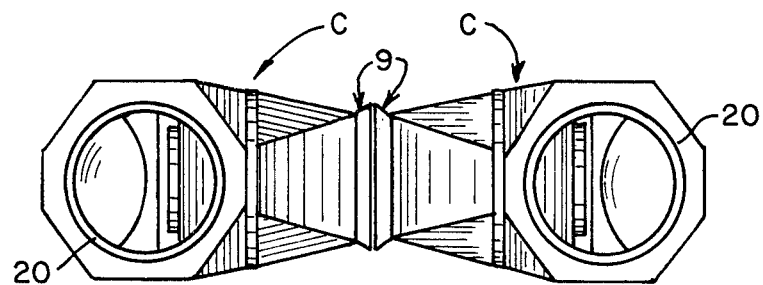
FIG. 8 provides a front view of a pair of swivel connectors as when used in combination with a fuel nozzle and for vapor recovery.
Figure 9:
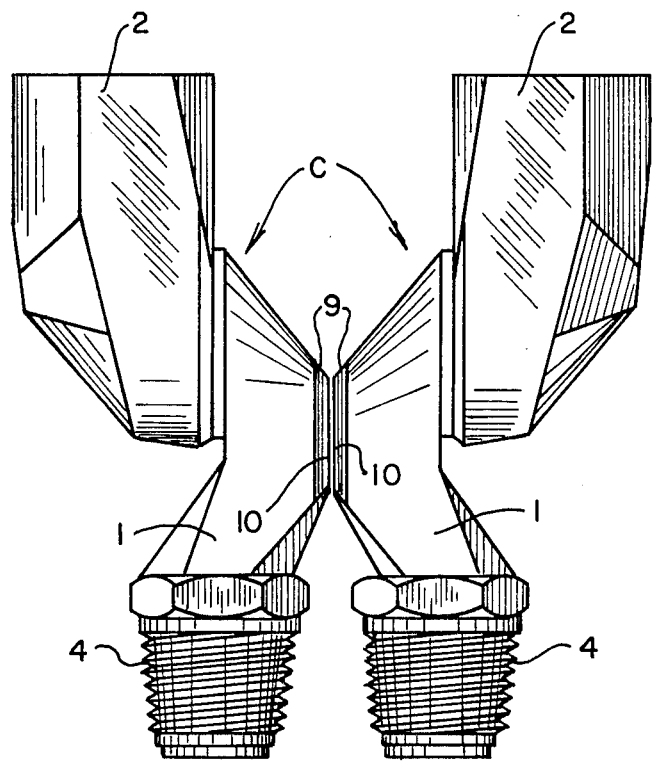
FIG. 9 provides a top plan view of the pair of swivel connectors shown in FIG. 8.

FIGS. 8 and 9 disclose the use of a pair of the swivel connectors C, and it can be seen that the boss like members 9 of the adjacently disposed connectors are arranged in close proximity during their securement, as through their swivel nuts 4, into the back end of one of the fuel nozzles. These boss like members 9, with their flared edges, as shown, allow for some degree of pivot of the two connectors relative to each other as the nozzle is shifted into position for application of its spout into the fuel tank, but that their flared portions 10, eventually encounter each other, at this location, after some degree of pivot or swivel is achieved, but not until at least a sufficient amount of manipulation of the nozzle has been achieved. But, when excessive pivot is undertaken, and normally that which is beyond the required amount, the flared portions of these boss members encounter each other, to prevent any further swivel or pivot for the nozzle, at the location of its paired connectors. Thus, the type of binding that may occur with the prior art style of nozzle when used for vapor recovery purposes, which locks the nozzle into a twisted location, is obviated through the use of the shaped member 9 being provided at the location as shown upon each of the swivel connectors, when arranged laterally of each other within a nozzle assembly for use for vapor recovery purposes.

Figure 7:
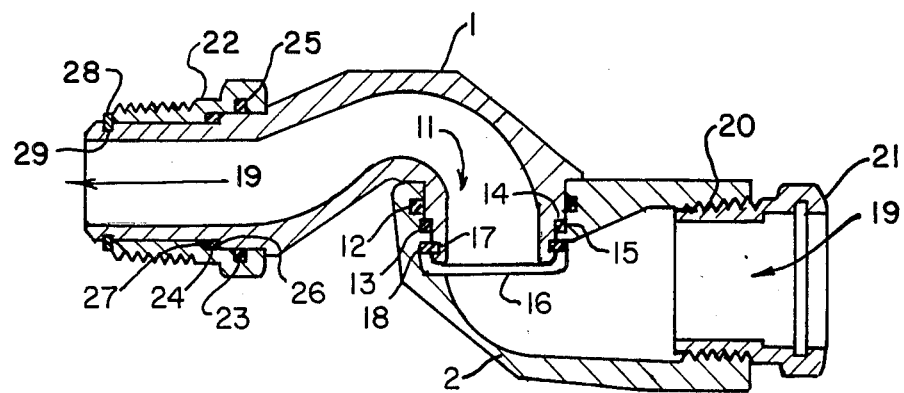
FIG. 7 provides a longitudinal sectional view of the swivel connector taken along the line 7—7 of FIG. 2.

The internal construction of this particular swivel connector is more accurately shown in FIG. 7. The male swivel portion 1 is disclosed, connecting by means of a sealed bearing, as at 11, with the female swivel portion 2. The sealed bearing, as at 11, which forms the main swivel joint between these two portions comprises a pair of O-rings, as at 12 and 13. The O-ring 12 is arranged for fitting within a cavity formed within the inner periphery of the swivel portion 2, while the O-ring 13 is arranged for locating intermediate a pair of shoulders, one as at 14, formed upon the male portion 1, while the other shoulder 15 provides for seating of the ring 13 intermediate these two portions. The inwardmost inserted end 16 of the swivel portion 1 is additionally arranged containing a groove, as at 17, for accommodation of a retaining means, such as the snap ring 18, for securing the swivel portion 1 inserted within the swivel portion 2. This locking of the snap ring 18 within this swivel to form this connection generally is obtained by access through the channel, as at 19, formed through the swivel connector. It may be commented that this channel 19 formed through this swivel connector may be of angular configuration, or perhaps undertake any other shape or configuration, such as at an oval, or other conic, in order to maximize flow through the swivel connector but yet allowing for a reduction in its dimensions from the type of swivel connectors normally employed in the fuel lines. In addition, while the channel through the pivotal connection is shown being arranged at approximately ninety degrees, the connection can be formed at other angles, such as at forty five degrees, to yet allow for freer flow of fuel through the swivel connector.

At the other end of the swivel portion 2 there is provided means, such as the thread means 20, for accommodating another fitting, as at 21, or other form of junction, for use for secuting this end of the swivel connector to the fuel line hose.

At the opposite end of the swivel connector, or at the other end of the swivel portion 1, there is provided another form of connecting means, such as the swivel nut 22, as shown, and which is provided for furnishing another plane of swivel for the connector after its installation within the fuel dispensing means. In this particular instance, the swivel nut 22 will secure with the fuel nozzle, be tightly connected therewith, but yet be afforded with some degree of swivel due to the means for mounting of this swivel nut onto the connector. As can be seen, the swivel nut contains locations where the O-rings 23 and 24 are arranged intermediate the swivel nut and the contiguous surface of the swivel portion 1. These O-rings are of a smaller diameter size, perhaps being only one sixteenth of an inch, more or less, in dimension, but are arranged surrounding the swivel portion, as in the case of the O-ring 23, which also seats within a recess or groove 25 provided within the formed nut. In addition, the O-ring 24 is arranged between a pair of shoulders, such as the shoulder 26 formed upon the swivel 1, and the opposite arranged shoulder 27 formed or counterboard within the swivel nut 22. Thus, when the swivel nut 22 is pushed into position upon the end of the swivel portion 1, and its O-rings are located in place, the O-ring 24 will become reasonably compressed between these two shoulder portions, as defined, and at that time another snap ring, as at 28, is compressed into position within the groove 29, in order to reasonably fix the swivel nut 22 upon this proximate end of the swivel portion, and allow for swiveling of the nut along this plane of connection, but at the same time, through the agency of its particularly formed O-rings 23 and 24, will provide a fluid tight seal thereat. It is also to be noted that the O-rings 23 and 24, in their positioning intermediate the swivel nut and this end of the swivel portion, are of different diameter, being stepped in their relationship, so that the outer O-ring 23, just as the O-ring 12, with its larger diameter, is effective for preventing the entrance of any dust or other deleterious particles into the confinement of the swivel nut upon the portion 1, and to prevent said particles from attaining access to the more substantial fluid tight seal formed intermediate these two portions through the location of the O-ring 24 as shown.

As previously explained, these O-rings 23 and 24, in addition to 12 and 13, are constructed of a particular composition, generally a fluoro composition, which are effective for forming a fluid tight seal, but at the same time, have reduced frictional coefficients so as to ease the swivel of these various components relative to each other when applied in a fuel line situation.

Variations or modifications to the swivel connector of this invention may occur to those skilled in the art upon reviewing the subject matter of this invention. Such variations or modifications, if within the spirit of this invention, are intended to be encompassed within the scope of any claims to patent protection issuing upon the same. The description of the preferred embodiment set forth herein is done so for illustrative purposes only.

Having thus described the invention, what is claimed and desired to be secured by letters patent is:

1. A multi-plane and light of weight swivel connector for use in attaching a pair of fluid conveying members together and providing a fluid seal thereat, said connector including a pair of swivel portions that connect together at approximate ends, the end of one swivel portion being a male portion, while the end of the other swivel portion comprsing a female portion, said male portion extending within the femal portion to form a unitary joint, a double sealed connection provided at the unitary junction of the connection of the swivel ends together, said double sealed connection formed of a pair of seals provided between the male and female portions of the formed unitary swivel joint, an O-ring provided at each seal to form the fluid seal thereat, a retaining means provided within the connector for axial fixing of the swivel portions together but allowing them their swivel motion with respect to each other, said swivel connector useful for attaching in a fuel line, one end of the connector securing with a fuel hose, and the other end of the connector useful for securing with a dispenser nozzle or the like, said double sealed connection forming an inner and outer sealed bearing for the swivel connector, said inner and outer sealed bearings being stepped, with one 0-ring of the sealed connection having a lesser diameter than the other O-ring of the other sealed connection, the inner said O-ring being of a lesser diameter than the outer O-ring, said lesser diametered O-ring being formed to provide low temperature flexibility to assure a continuing fluid seal, there being opposing shoulder formed upon each of the male and female portions, and said inner O-ring being located intermediate the said shoulders, said male portion forming a surface outwardly of its formed shoulder, and said outer O-ring cooperating with the female portion and seating upon the formed surface, said outer O-ring being formed to provide increased resistance to abrasive wear, and the retaining means disposed proximate the inwardmost part of the male portion for attaching the male and female portions together, there being a ring seat formed upon and near the proximate end of the male portion, and another shoulder formed on the inwardmost part of the female portion, with said retaining ring engaging with said another shoulder and seating within the seat for securing the two swivel portions together at their unitary junction, said swivel portions being formed of die cast injection molding from a zinc-aluminum alloy that is rapidly chilled under pressure to retard dendritic growth, and said O-rings being formed of fluoro composition comprising one of a fluoro carbon and fluoro silicone.

2. The invention of claim 1 and including a pair of said swivel connectors attaching in a fuel line, the second connector useful for accomplishing vapor recovery.

3. The invention of claim 1 and wherein the inner O-ring is formed of fluorosilicone, and the outer O-ring is formed of fluorocarbon.

4. The invention of claim 1 and including a connection means provided at the opposite end of one of the pair of swivel portions and useful for attaching with one of the fuel hose and nozzle.

5. The invention of claim 4 and including another connecting means provided at the opposite end of the other of the pair of swivel portions and useful for securing with the other of the fuel hose and nozzle.

6. The invention of claim 5 and wherein the first mentioned connecting means secures with the fuel hose, and the second mentioned other connecting means secures with the fuel nozzle.

7. The invention of claim 6 and wherein the said other connecting means comprises a swivel nut.

8. The invention of claim 7 and wherein the said swivel nut secures externally onto the outer end of the other of the pair of said swivel portions.

9. The invention of claim 8 and including a double sealed connection provided at a unitary juncation between the said swivel nut and the said contiguous swivel portion.

10. The invention of claim 9 and wherein said double sealed connection forms an inner and outer sealed bearing for the swivel portion.

11. The invention of claim 10 and wherein the said inner and outer sealed bearing between the swivel nut and swivel portion being stepped, with an O-ring provided intermediate the said swivel nut and the contiguous swivel portion at each bearing to form a fluid tight seal thereat.

12. The invention of claim 11 wherein the inner sealed bearing has a lesser diameter than the outer sealed bearing.

13. The invention of claim 8 and including a retainer ring securing the swivel nut onto the said swivel portion.

14. The invention of claim 13 and wherein said retainer ring clamping onto the end of the swivel portion and biasing against an edge of the swivel nut.

* * * * *